US012299334B2

(12) United States Patent
Takabayashi et al.

(10) Patent No.: US 12,299,334 B2
(45) Date of Patent: May 13, 2025

(54) IMAGE FORMING SYSTEM, NON-TRANSITORY COMPUTER READABLE MEDIUM STORING PROGRAM, AND IMAGE FORMING METHOD FOR ACCOMMODATING A PAPER SHEET AND EXECUTING PROCESSING OF PRINTING AN IMAGE ON THE ACCOMMODATED PAPER SHEET

(71) Applicant: FUJIFILM Business Innovation Corp., Tokyo (JP)

(72) Inventors: Masae Takabayashi, Kanagawa (JP); Katsuyuki Fujii, Kanagawa (JP); Toshihiro Osakabe, Kanagawa (JP); Koji Sunohara, Kanagawa (JP); Takayoshi Sato, Kanagawa (JP); Masashi Hara, Kanagawa (JP); Ryoji Kawaguchi, Kanagawa (JP); Yuki Akechi, Kanagawa (JP); Yutaka Watanabe, Kanagawa (JP); Yumiko Arai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/395,489

(22) Filed: Aug. 6, 2021

(65) Prior Publication Data

US 2022/0283749 A1    Sep. 8, 2022

(30) Foreign Application Priority Data

Mar. 2, 2021    (JP) .................................. 2021-032428

(51) Int. Cl.
*G06F 3/12*        (2006.01)

(52) U.S. Cl.
CPC ............ *G06F 3/121* (2013.01); *G06F 3/1207* (2013.01); *G06F 3/1211* (2013.01); *G06F 3/1235* (2013.01)

(58) Field of Classification Search
CPC ...... G06F 3/121; G06F 3/1207; G06F 3/1211; G06F 3/1235; H04N 1/00663;
(Continued)

(56) References Cited

U.S. PATENT DOCUMENTS

2008/0079980 A1*   4/2008   Matsubara .............. G06F 3/121
                                                        358/1.14
2012/0288311 A1    11/2012  Hosoda
(Continued)

FOREIGN PATENT DOCUMENTS

JP    2007322465    12/2007
JP    2012236281    12/2012
(Continued)

OTHER PUBLICATIONS

"Notice of Reasons for Refusal of Japan Counterpart Application", issued on Oct. 15, 2024, with English translation thereof, pp. 1-8.
"Notice of Reasons for Refusal of Japan Counterpart Application", issued on Feb. 25, 2025, with English translation thereof, pp. 1-4.

*Primary Examiner* — Juan M Guillermety
(74) *Attorney, Agent, or Firm* — JCIPRNET

(57) ABSTRACT

An image forming system includes a processor configured to, in a case where a determination that an abnormality is not present in an image printed on a paper sheet fed from a first paper feeding source is made, discharge a first paper sheet on which the image determined as not having the abnormality is printed to a first discharge destination, in a case where a determination that the abnormality is present in the image is made, discharge a second paper sheet on which the image determined as having the abnormality is printed to a second discharge destination, discharge a paper sheet of a subse- (Continued)

quent page of the second paper sheet to a third discharge destination and temporarily stop printing processing, notify a user of an instruction to arrange the paper sheet discharged to the third discharge destination in a second paper feeding source different from the first paper feeding source, and in a case where a notification indicating that the paper sheet discharged to the third discharge destination is arranged in the second paper feeding source is received from the user, discharge the paper sheet arranged in the second paper feeding source to the first discharge destination by transporting the paper sheet after a paper sheet on which the image of the second paper sheet is reprinted.

10 Claims, 20 Drawing Sheets

(58) Field of Classification Search
CPC .......... H04N 1/00079; H04N 1/00029; H04N 1/00824; H04N 1/00082; H04N 1/00633
See application file for complete search history.

(56) References Cited

U.S. PATENT DOCUMENTS

| | | | |
|---|---|---|---|
| 2015/0131116 A1* | 5/2015 | Sochi | H04N 1/00082 358/1.14 |
| 2018/0152573 A1* | 5/2018 | Taki | H04N 1/00663 |
| 2018/0157446 A1 | 6/2018 | Fukuda | |
| 2018/0329352 A1* | 11/2018 | Yamashita | G03G 15/502 |
| 2019/0052763 A1* | 2/2019 | Kayama | G06F 3/121 |
| 2020/0089150 A1* | 3/2020 | Tokuma | G03G 15/6529 |
| 2021/0034310 A1* | 2/2021 | Ikuno | G06F 3/121 |
| 2022/0334528 A1 | 10/2022 | Yamashita | |

FOREIGN PATENT DOCUMENTS

| | | |
|---|---|---|
| JP | 2014144627 | 8/2014 |
| JP | 2014153560 | 8/2014 |
| JP | 2018089869 | 6/2018 |
| JP | 2018194580 | 12/2018 |
| JP | 2021024183 | 2/2021 |

\* cited by examiner

MESSAGE DISPLAY EXAMPLE (STEP S302)

FIG. 10 MESSAGE DISPLAY EXAMPLE (STEPS S303 AND S304)

IN CASE OF DISCHARGING WASTE PAPER TO DISCHARGE TRAY 43

MESSAGE DISPLAY EXAMPLE IN CASE OF DISCHARGING WASTE PAPER TO DISCHARGE TRAY 43

PLEASE REMOVE ONE LOWERMOST PAPER SHEET DISCHARGED TO DISCHARGE DESTINATION (3) (DISCHARGE TRAY 43)
AND MOVE PAPER SHEET TO PAPER FEEDING SOURCE (2).
PLEASE PRESS EXECUTION BUTTON AFTER YOU ARE READY.

IMAGE FORMING SYSTEM, NON-TRANSITORY COMPUTER READABLE MEDIUM STORING PROGRAM, AND IMAGE FORMING METHOD FOR ACCOMMODATING A PAPER SHEET AND EXECUTING PROCESSING OF PRINTING AN IMAGE ON THE ACCOMMODATED PAPER SHEET

CROSS-REFERENCE TO RELATED APPLICATIONS

This application is based on and claims priority under 35 USC 119 from Japanese Patent Application No. 2021-032428 filed Mar. 2, 2021.

BACKGROUND

(i) Technical Field

The present invention relates to an image forming system, a non-transitory computer readable medium storing a program, and an image forming method.

(ii) Related Art

JP2012-236281A discloses a quality inspection system that discharges a sheet determined as being not normal by quality inspection processing to a first discharge destination without executing binding processing on the sheet and a sheet bundle stacked before the sheet, and performs post-processing on a sheet fed after the sheet determined as being not normal and discharges the post-processed sheet to a second discharge destination.

JP2014-144627A discloses an image forming system capable of easily removing waste paper determined as a defect by detecting a defective state of a paper sheet on which an image is formed, performing reprinting on pages including a page determined as a defect and subsequent pages, and discharging the pages to a discharge destination different from a discharge destination immediately before the determination of the defect.

JP2014-153560A discloses an image forming control device that implements an automatic recovery also considering a page order by discharging a paper sheet which is transported while a paper sheet related to a re-output instruction is discharged to a discharge tray, to a buffer tray which temporarily holds a plurality of paper sheets for performing post-processing in a post-processing device.

SUMMARY

Aspects of non-limiting embodiments of the present disclosure relate to an image forming system and a non-transitory computer readable medium storing a program that can generate a printed bundle in a state where spoiled paper is not included, without using a standby tray capable of causing a paper sheet in transport to stand by even in a case where spoiled paper on which an abnormal image is printed occurs in the middle of printing an image on a plurality of paper sheets.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system including a processor configured to, in a case where a determination that an abnormality is not present in an image printed on a paper sheet fed from a first paper feeding source is made, discharge a first paper sheet on which the image determined as not having the abnormality is printed to a first discharge destination, in a case where a determination that the abnormality is present in the image is made, discharge a second paper sheet on which the image determined as having the abnormality is printed to a second discharge destination, discharge a paper sheet of a subsequent page of the second paper sheet to a third discharge destination and temporarily stop printing processing, notify a user of an instruction to arrange the paper sheet discharged to the third discharge destination in a second paper feeding source different from the first paper feeding source, and in a case where a notification indicating that the paper sheet discharged to the third discharge destination is arranged in the second paper feeding source is received from the user, discharge the paper sheet arranged in the second paper feeding source to the first discharge destination by transporting the paper sheet after a paper sheet on which the image of the second paper sheet is reprinted.

BRIEF DESCRIPTION OF THE DRAWINGS

Exemplary embodiment(s) of the present invention will be described in detail based on the following figures, wherein.

DETAILED DESCRIPTION

Next, an exemplary embodiment of the present invention will be described in detail with reference to the drawings.

Figure 1:
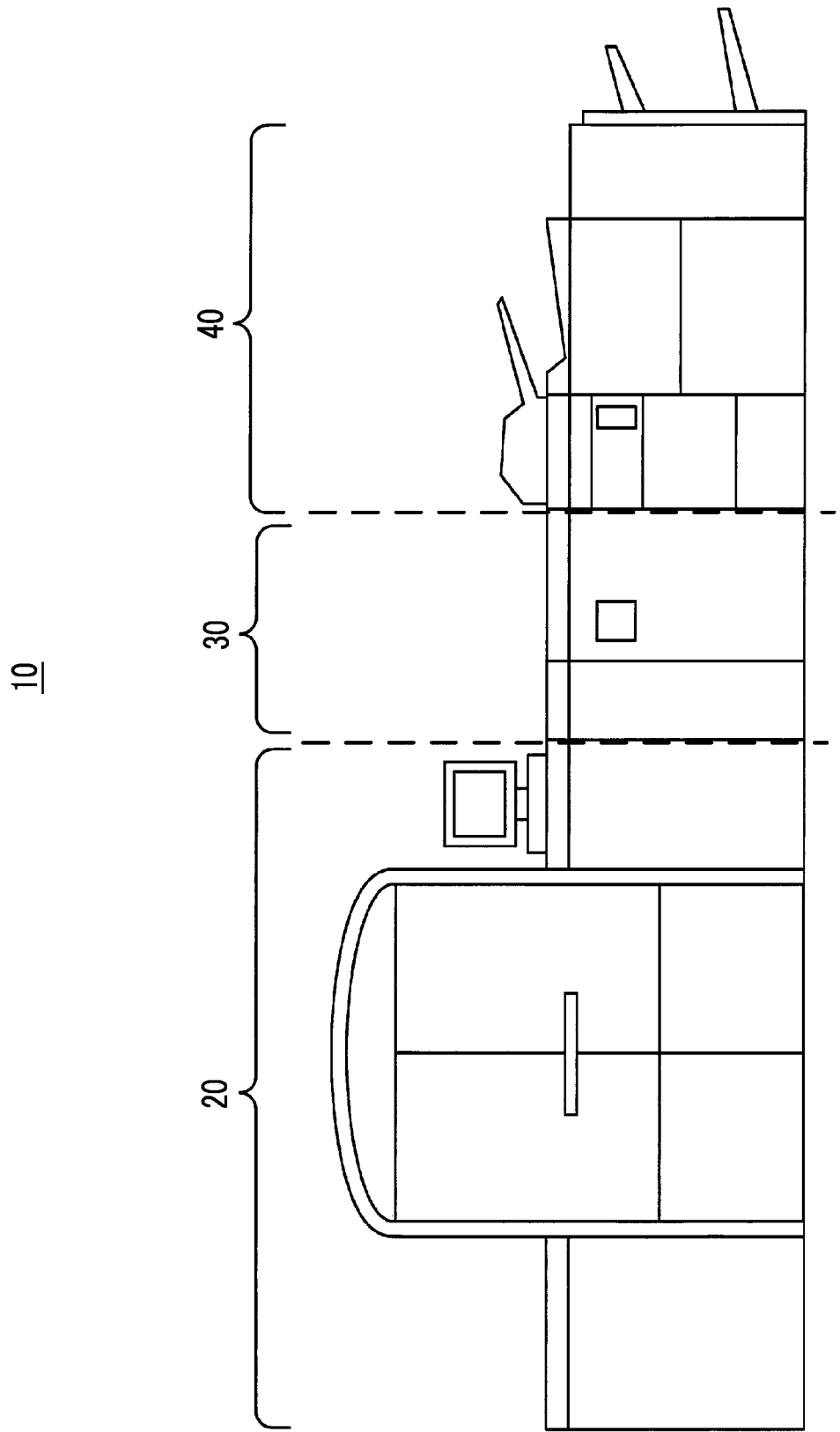
FIG. 1 is a diagram illustrating a system configuration of an image forming system 10 of an exemplary embodiment of the present invention.

FIG. 1 is a diagram illustrating a system configuration of an image forming system 10 of the exemplary embodiment of the present invention.

As illustrated in FIG. 1, the image forming system 10 of the exemplary embodiment of the present invention is configured with an image forming apparatus 20, a quality inspection device 30, and a post-processing device 40.

The image forming apparatus 20 has a function of accommodating a paper sheet and executing processing of printing an image on the accommodated paper sheet. The quality inspection device 30 receives the paper sheet on which the image is printed from the image forming apparatus 20 and executes quality inspection on the image printed on the paper sheet, that is, a determination as to whether or not the image printed on the paper sheet is abnormal.

Specifically, the quality inspection device 30 receives image data of the image printed on the paper sheet from the image forming apparatus 20, reads the image of the paper sheet transported from the image forming apparatus 20, compares the image of the received image data with the read image, and determines whether the image printed on the transported paper sheet is normal or abnormal.

The post-processing device 40 executes various types of post-processing such as folding processing, stapling processing, punching processing, and booklet manufacturing processing on the paper sheet after the quality inspection performed by the quality inspection device 30, and discharges the paper sheet to the discharge tray.

Figure 2:
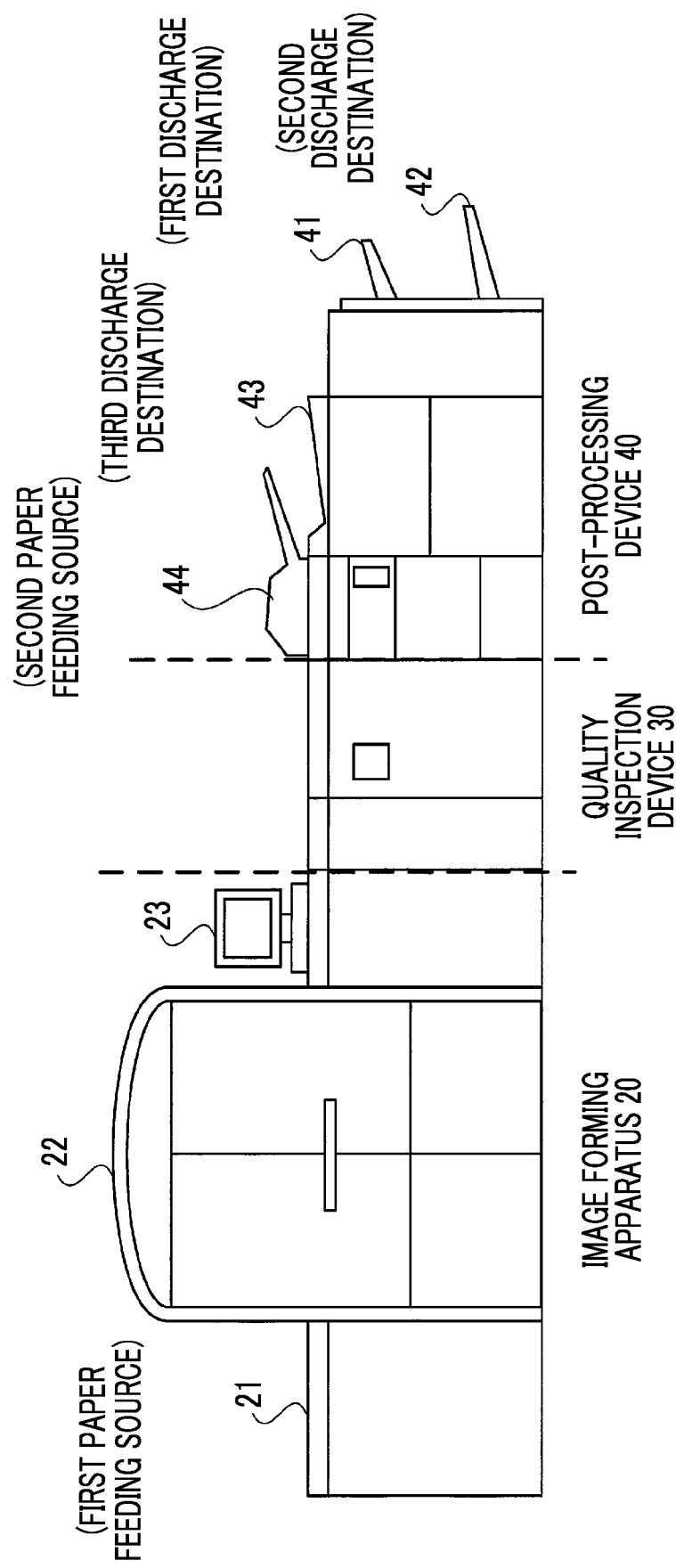
FIG. 2 is a diagram for describing a name of each unit of an image forming apparatus 20, a quality inspection device 30, and a post-processing device 40 constituting the image forming system 10 of the exemplary embodiment of the present invention.

Next, a name of each unit of the image forming apparatus 20, the quality inspection device 30, and the post-processing device 40 constituting the image forming system 10 of the exemplary embodiment will be described with reference to FIG. 2.

The image forming apparatus 20 includes a paper feeding device 21 that has a function of accommodating multiple paper sheets and feeding paper, an image forming apparatus main body 22 in which an image is printed on a paper sheet fed from the paper feeding device 21, and an operation panel 23 on which an operation input from a user is performed, or various types of information such as a state of printing processing is displayed to the user.

In addition, the post-processing device 40 includes three discharge trays 41 to 43 for discharging a paper sheet after the post-processing. In addition, the post-processing device 40 includes a device referred to as an interposer capable of feeding a paper sheet from the middle of a transport path, and a paper sheet fed from a paper feeding tray 44 is configured to be feedable onto a paper sheet transport path from the quality inspection device 30.

Here, the paper feeding device 21 in the image forming apparatus 20 may be referred to as a first paper feeding source, and the paper feeding tray 44 disposed in the post-processing device 40 may be referred to as a second paper feeding source. In addition, the discharge trays 41 to 43 disposed in the post-processing device 40 may be referred to as a first discharge destination, a second discharge destination, and a third discharge destination, respectively.

In the image forming system 10 of the exemplary embodiment configured in the above manner, a flow of performing the quality inspection in the quality inspection device 30 on the paper sheet after printing in the image forming apparatus 20 and performing the post-processing on the paper sheet after the quality inspection in the post-processing device 40 is implemented.

In performing a work in such a flow, in a case where an abnormal image is detected in the quality inspection device 30, a paper sheet of the image in which an abnormality is detected is discharged and discarded by switching a discharge destination of the paper sheet, and printing is performed again on a discarded page. However, even in a case where the abnormality is detected in the image of a certain page, printing of a subsequent page has already been performed. Thus, reprinting may not be performed on only the page on which the image is abnormal.

For example, in a case of performing the printing processing on a plurality of pages in the image forming apparatus 20 and then, performing the stapling processing in the post-processing device 40, the stapling processing cannot be executed without all pages aligned in a normal state. Thus, the reprinting needs to be performed from the page on which the abnormality is detected in the image, by discarding all paper sheets of the page on which the abnormality is detected in the image due to a defect in the printing processing, and the page on which printing has already been performed before the reprinting of the page.

For example, a state of performing the reprinting by switching the discharge destination in a case where NG paper that is abnormal occurs in the quality inspection at execution of a printing job of performing the printing processing on paper sheets of seven pages and then, performing the stapling processing will be described using FIG. 3.

Figure 3:
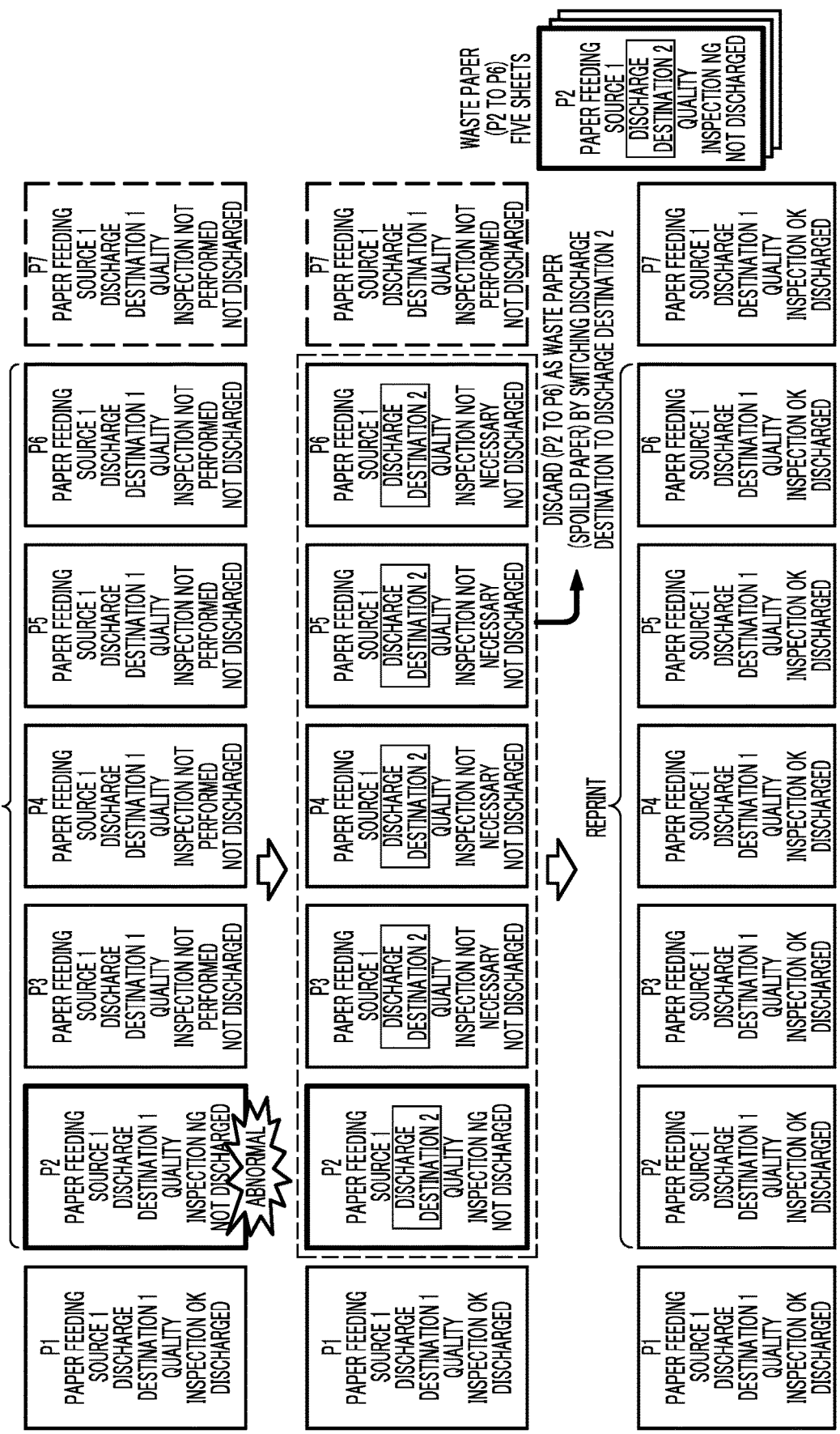
FIG. 3 is a diagram for describing a state of performing reprinting by switching a discharge destination in a case where NG paper that is abnormal occurs in quality inspection at execution of a printing job of performing printing processing on paper sheets of seven pages and then, performing stapling processing.

In FIG. 3, the printing job is described as being executed with setting such that the first to seventh pages (P1 to P7) are fed from the first paper feeding source (displayed as paper feeding source (1) and discharged to the first discharge destination (displayed as discharge destination 1).

In a case where printing of the first page is completed by executing such a printing job, and the abnormality is detected in the quality inspection of the second page, an assumption that printing has already been performed on the third page to the sixth page, and that transport of the third page to the sixth page has started is made.

Then, the paper sheets of the second to sixth pages including the second page resulting in NG in the quality inspection and the third page to the sixth page of which the transport has started are discharged and discarded as waste paper (spoiled paper) by switching the discharge destination from the first discharge destination to, for example, the second discharge destination.

Then, in a case where printing is normally performed up to the seventh page by performing the reprinting from the second page, the stapling processing is executed on a paper sheet bundle of the seven pages.

In such a case, total 12 paper sheets including not only the seven paper sheets of the seven pages on which the stapling processing is performed, but also five paper sheets of the discarded second to sixth pages are used. That is, while printing of only one paper sheet of the second page is abnormal, five paper sheets are discarded as the waste paper. Accordingly, in a case where the paper sheet that results in NG in the quality inspection occurs in the middle of performing the quality inspection on the paper sheet after the printing processing and executing the post-processing, performing the post-processing without a pause causes all paper sheets after the printing processing subsequent to the paper sheet resulting in NG in the quality inspection to be temporarily discarded, and paper sheets of multiple pages are wasted as the waste paper.

In such a case, only the paper sheet of the second page can be wasted as the waste paper by causing the paper sheets of the third to sixth pages after printing to stand by in a standby tray. However, in a case where the standby tray capable of causing a paper sheet in transport to stand by is disposed in an image system, a problem of size increase of the apparatus arises.

Therefore, in the image forming system of the exemplary embodiment, even in a case where the spoiled paper on which the abnormal image is printed occurs in the middle of printing the image on a plurality of paper sheets, a printed bundle in a state where the spoiled paper is not included may be generated without using the standby tray capable of causing the paper sheet in transport to stand by, by performing processing illustrated below.

Figure 4:
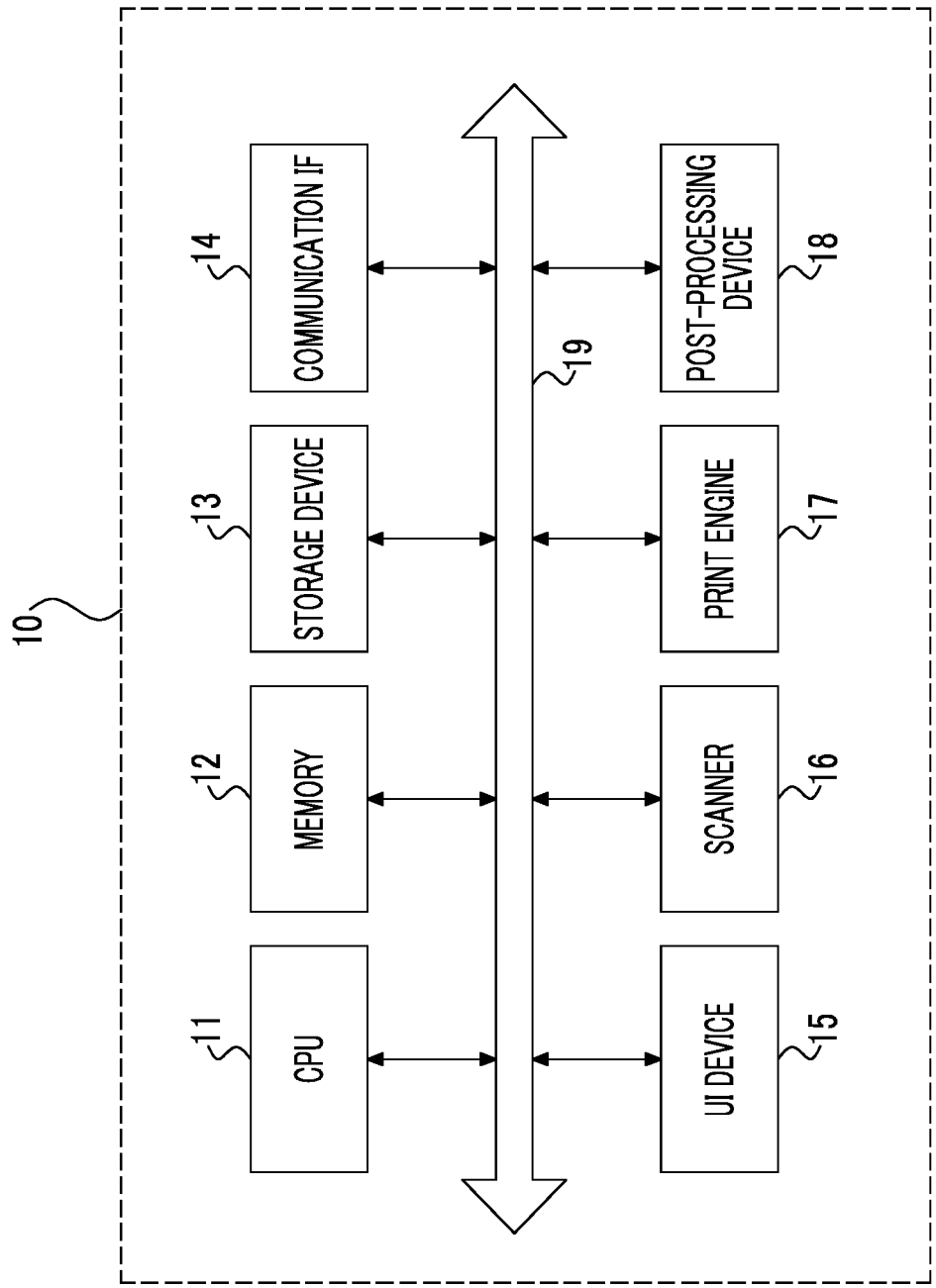
FIG. 4 is a diagram illustrating a hardware configuration of the image forming system 10 of the exemplary embodiment of the present invention.

Next, a hardware configuration of the image forming system 10 of the exemplary embodiment is illustrated in FIG. 4. While the image forming system 10 in FIG. 4 is described as a hardware configuration in which only one CPU is disposed for simplification of description, each of the image forming apparatus 20, the quality inspection device 30, and the post-processing device 40 may have the hardware configuration illustrated in FIG. 4.

As illustrated in FIG. 4, the image forming system 10 includes a CPU 11, a memory 12, a storage device 13 such as a hard disk drive, a communication interface (abbreviated to IF) 14 that transmits and receives data to and from an external apparatus or the like through a network 30, a user interface (abbreviated to UI) device 15 that includes a touch panel or a liquid crystal display and a keyboard, a scanner 16, a print engine 17, and a post-processing device 18. These constituents are connected to each other through a control bus 19.

The CPU 11 is a processor that controls an operation of the image forming system 10 by executing a predetermined type of processing based on a control program stored in the memory 12 or the storage device 13. While the CPU 11 in the exemplary embodiment is described as reading and executing the control program stored in the memory 12 or the storage device 13, the program can be stored in a storage medium such as a CD-ROM and provided to the CPU 11.

Figure 5:
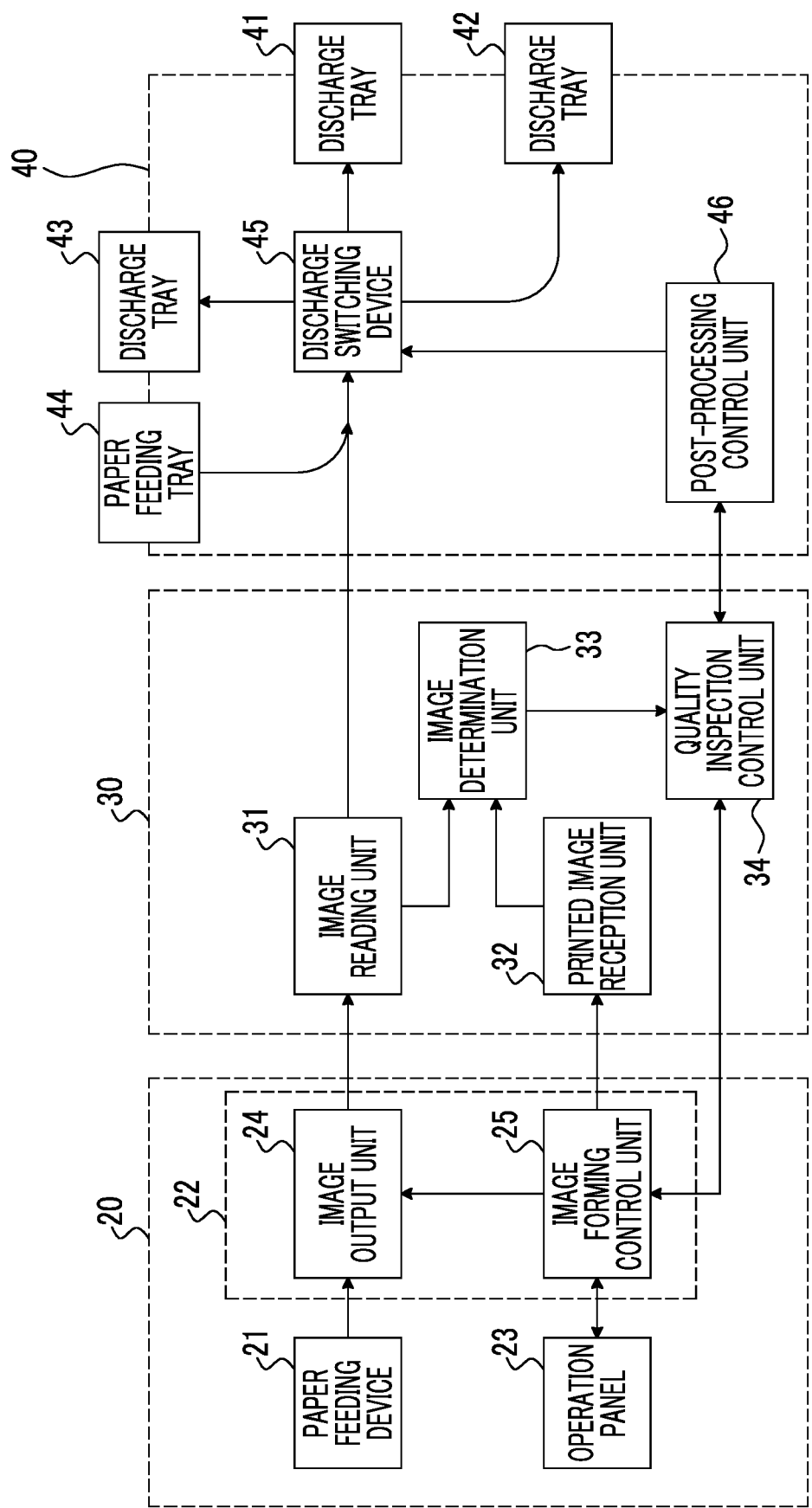
FIG. 5 is a block diagram illustrating a functional configuration of the image forming system 10 of the exemplary embodiment of the present invention.

FIG. 5 is a block diagram illustrating a functional configuration of the image forming system 10 implemented by executing the control program.

In the image forming system 10 of the exemplary embodiment, as illustrated in FIG. 5, the image forming apparatus 20 includes the paper feeding device 21, the operation panel 23, an image output unit 24, and an image forming control unit 25. In addition, the quality inspection device 30 includes an image reading unit 31, a printed image reception unit 32, an image determination unit 33, and a quality inspection control unit 34. Furthermore, the post-processing device 40 includes the discharge trays 41 to 43, the paper feeding tray 44, a discharge switching device 45, and a post-processing control unit 46.

The paper feeding device 21 accommodates a paper sheet before the image is formed and feeds the paper sheet to the image output unit 24. The image output unit 24 prints the image on the paper sheet fed from the paper feeding device 21. The image forming control unit 25 causes the image output unit 24 to execute processing of printing the image on the paper sheet by controlling an operation of the image output unit 24. The operation panel 23 displays various types of information to the user or transfers input information from the user to the image forming control unit 25.

The image forming control unit 25 transmits information about the printed image printed on the paper sheet to the quality inspection control unit 34 in the quality inspection device 30.

The image reading unit 31 in the quality inspection device 30 reads the image from the paper sheet on which the image is printed in the image output unit 24. The printed image reception unit 32 receives the information about the printed image transmitted from the image forming control unit 25.

The image determination unit 33 determines whether or not the abnormality is present in the image printed on the paper sheet by comparing the image read by the image reading unit 31 with the printed image received by the printed image reception unit 32. Specifically, in a case where a printing defect occurs due to various causes such as a printing stain, a printing blur, and a toner abnormality, the image determination unit 33 determines that the image printed on the paper sheet is abnormal.

Here, in a case where the image printed on the paper sheet is not abnormal, the image read by the image reading unit 31 has to match the printed image received by the printed image reception unit 32. Thus, in a case where the image read by the image reading unit 31 does not match the printed image received by the printed image reception unit 32, the image determination unit 33 determines that the image printed on the paper sheet is abnormal.

The quality inspection control unit 34 controls an operation of the quality inspection device 30, and receives a determination result from the image determination unit 33 and transmits the determination result to the image forming control unit 25 and the post-processing control unit 46. Specifically, the quality inspection control unit 34 transmits, to the image forming control unit 25, information about which page the abnormality of the image is detected on, and information or the like about which page the reprinting is to be executed from. In addition, the quality inspection control unit 34 transmits, to the post-processing control unit 46, the information about which page the abnormality of the image is detected, and information or the like about the page on which printing has already been performed before execution of the reprinting.

The discharge switching device 45 in the post-processing device 40 switches the discharge destination of the paper sheet transported from the quality inspection device 30 to any of the discharge trays 41 to 43. The post-processing control unit 46 controls an operation of the post-processing device 40, and performs a paper feeding control for the paper sheet set in the paper feeding tray 44 and a control for issuing an instruction about which discharge destination switching is performed to the discharge switching device 45, based on quality inspection information from the quality inspection control unit 34.

The image forming control unit 25, the quality inspection control unit 34, and the post-processing control unit 46 control an overall operation of the image forming system 10 by operating in connection with each other by transmitting and receiving information.

In the image forming system 10 configured in the above manner, in a case where the abnormality of the image is detected in the quality inspection device 30, an operation illustrated below is performed.

First, in a case where a determination that the abnormality is not present in the image printed on the paper sheet fed from the paper feeding device 21 that is the first paper feeding source is made, the post-processing control unit 46 performs a control for discharging the paper sheet on which the image determined as not having the abnormality is printed, to the discharge tray 41 that is the first discharge destination.

In a case where a determination that the abnormality is present in the image printed on the paper sheet fed from the paper feeding device 21 is made, the post-processing control unit 46 performs a control for discharging the paper sheet on which the image determined as having the abnormality is printed, to the discharge tray 42 that is the second discharge destination.

The post-processing control unit 46 performs a control for discharging a paper sheet of a subsequent page of the paper sheet on which the image determined as having the abnormality is printed, to the discharge tray 43 that is the third discharge destination.

Then, the image forming control unit 25 temporarily stops the printing processing and notifies the user by displaying, on the operation panel 23, an instruction to arrange the paper sheet discharged to the discharge tray 43 in the paper feeding tray 44 that is the second paper feeding source different from the paper feeding device 21.

In a case where the image forming control unit 25 receives a notification indicating that the paper sheet discharged to the discharge tray 43 is arranged in the paper feeding tray 44, from the user through the operation panel 23, the post-processing control unit 46 performs a control for discharging the paper sheet arranged in the paper feeding tray 44 to the discharge tray 41 by transporting the paper sheet after the paper sheet on which the image determined as having the abnormality is reprinted. Reception of the notification indicating that the paper sheet discharged to the discharge tray is arranged in the paper feeding tray from the user may be reception of an instruction to resume printing, such that a response "Yes" with respect to a question "Is paper sheet discharged to discharge tray arranged in paper feeding tray?" is received, or a response "Yes" with respect to a question "Resume printing?" is received.

While the discharge trays 41 to 43 need to be used as three discharge destinations in order to implement the above processing, the same processing can be implemented using only two discharge destinations.

In this case, the first discharge destination and the second discharge destination are set to an identical discharge device of the discharge tray 41. In a case where the printing processing is temporarily stopped, the image forming control unit 25 notifies the user by displaying, on the operation panel 23, an instruction to remove the paper sheet determined as having the abnormality of the image from a paper sheet bundle discharged on the discharge tray 41.

Specifically, the image forming control unit 25 notifies the user of an instruction for the number of paper sheets to be removed from the top of the paper sheet bundle discharged on the discharge tray 41. For example, the image forming control unit 25 notifies the user of an instruction "Please remove and discard two paper sheets from top of paper sheet bundle discharged on discharge tray 41."

In a case of implementing the same processing using only two discharge destinations, the second discharge destination and the third discharge destination maybe set to an identical discharge device of the discharge tray 43.

In this case, in providing a notification of the instruction to arrange the paper sheet discharged to the discharge tray 43 in the paper feeding tray 44, the image forming control unit 25 also notifies the user of the instruction to remove the paper sheet determined as having the abnormality of the image from the paper sheet bundle discharged on the discharge tray 43. Specifically, the image forming control unit 25 further notifies the user of an instruction for the number of paper sheets to be removed from the bottom of the paper sheet bundle discharged on the discharge tray 43. For example, the image forming control unit 25 notifies the user of an instruction "Please remove and discard two paper sheets from bottom of paper sheet bundle discharged on discharge tray 43."

The post-processing control unit 46 may execute post-processing that provides distinction from another paper sheet, for example, post-processing such as the punching processing or the folding processing, on the paper sheet determined as having the abnormality in the printed image. By doing so, in a case of removing the paper sheet, the user may remove the paper sheet on which the punching processing or the folding processing is performed.

Next, an operation of the image forming system 10 of the exemplary embodiment will be described in detail with reference to the drawings.

Figure 6:
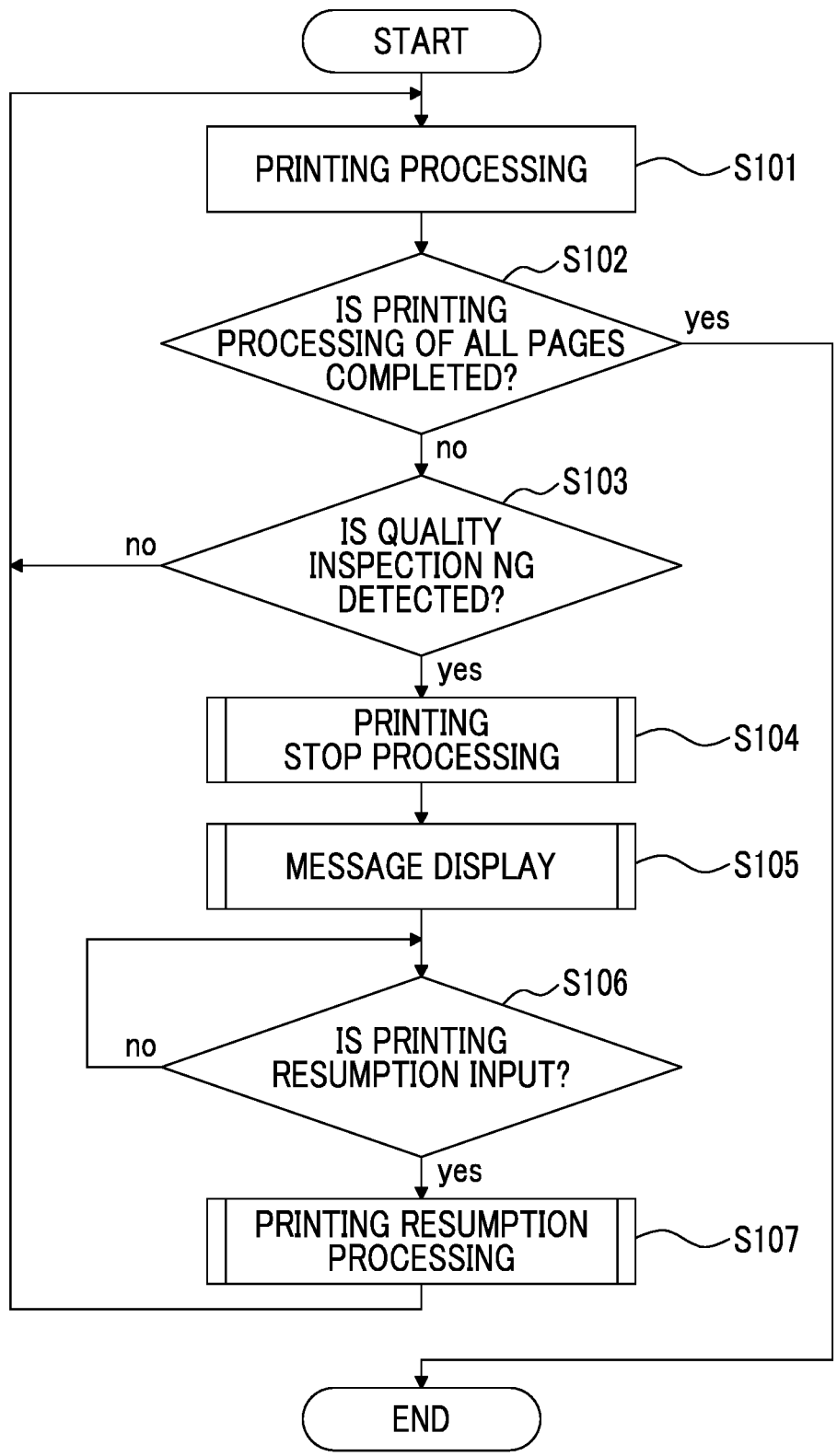
FIG. 6 is a flowchart for describing an overall operation of the image forming system 10 of the exemplary embodiment of the present invention.

First, the overall operation of the image forming system 10 of the exemplary embodiment will be described with reference to the flowchart of FIG. 6.

In the image forming apparatus 20, in step S101, the printing processing of each page is sequentially executed by the image output unit 24. This printing processing continues until a determination that the printing processing of all pages is completed is made in step S102.

In step S103, in a case where a determination that the abnormality is present in the image is made in the quality inspection in the quality inspection device 30 in the middle of the printing processing, processing from step S104 is executed. A determination that the abnormality is present is made in the quality inspection may be represented as quality inspection NG.

In a case where a determination that the abnormality is present is made in the quality inspection in the quality inspection device 30, printing stop processing is performed in step S104 in the image forming system 10. In step S105, the image forming system 10 displays a message for requesting the user to move the discharged paper sheet or remove the paper sheet determined as having the abnormality in the image on the operation panel 23.

In step S106, in a case where an instruction indicating that printing is resumed is input by the user, printing resumption processing is executed in the image forming system 10.

Figure 7:
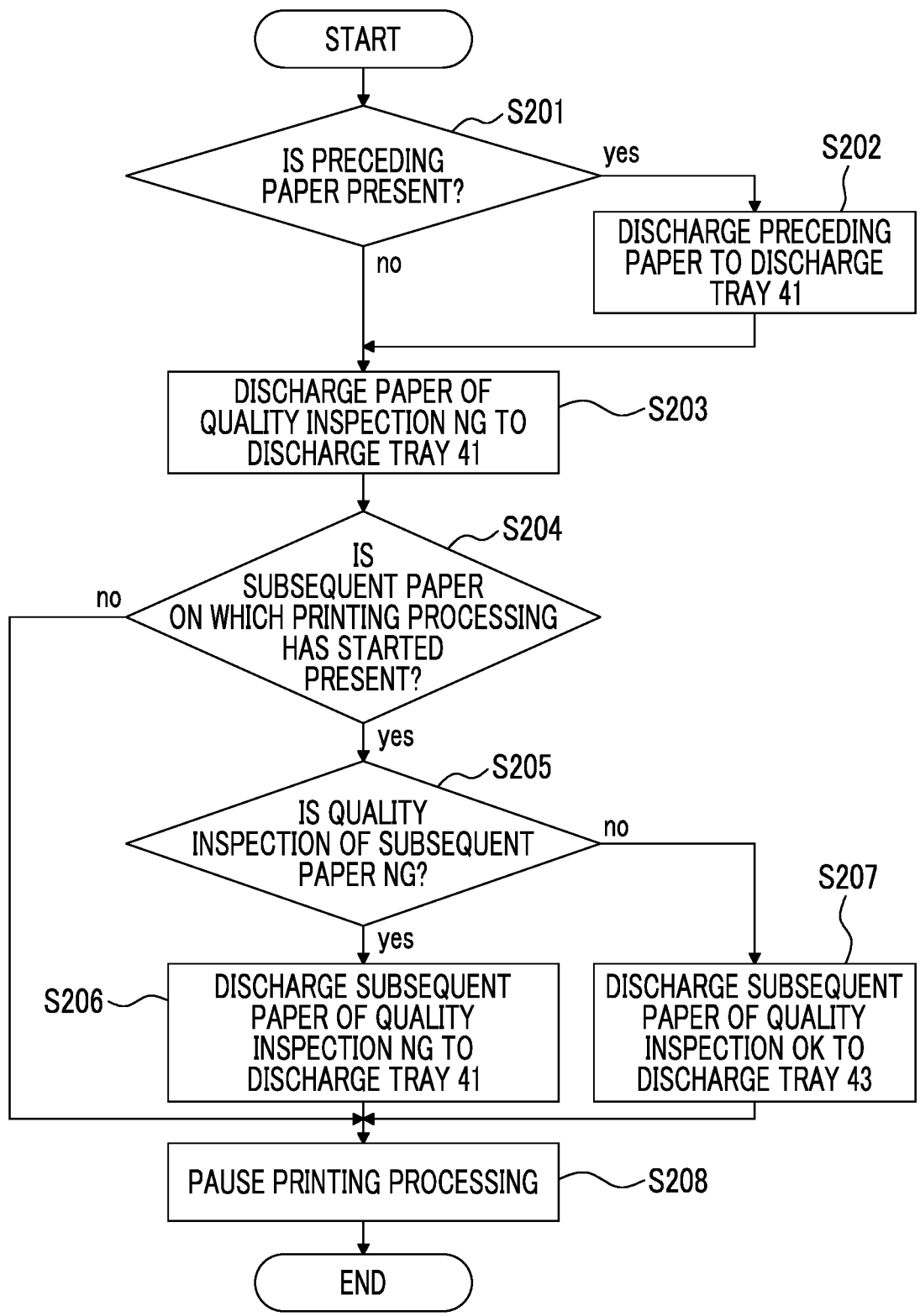
FIG. 7 is a flowchart for describing details of printing stop processing of step S104 in the flowchart of FIG. 6.

Next, details of the printing stop processing of step S104 described above will be described with reference to the flowchart of FIG. 7.

In the following exemplary embodiment, a case where the first discharge destination to which the paper sheet determined as not having the abnormality in the image is discharged, and a second discharge destination to which the paper sheet determined as having the abnormality in the image is discharged are shared using the discharge tray 41 will be described.

In stopping of the printing processing due to detection of the abnormality in the image, in a case where a determination that preceding paper that is a paper sheet not discharged yet after the printing processing is performed before the paper sheet on which the abnormality is detected is present is made in step S201, the post-processing control unit 46 of the post-processing device 40 in step S202 controls the discharge switching device 45 to discharge the preceding paper to the discharge tray 41.

In step S203, the post-processing control unit 46 controls the discharge switching device 45 to discharge quality inspection NG paper that is the paper sheet on which the abnormality in the image is detected, to the discharge tray 41.

Next, in step S204, in a case where a determination that subsequent paper that is a paper sheet of a subsequent page on which the printing processing has started at a point in time of determining that the abnormality is present in the image of the paper sheet of the certain page is present is made, the post-processing control unit 46 performs a control for discharging the subsequent paper to any of the discharge tray 41 or the discharge tray 43 based on a quality inspection result of the subsequent paper.

Specifically, in step S205, in a case where a determination that the abnormality is present in the image of the subsequent paper is made, the post-processing control unit 46 in step S206 performs a control for discharging the subsequent paper of the quality inspection NG to the discharge tray 41. In addition, in step S205, in a case where a determination that the abnormality is not present in the image of the subsequent paper is made, the post-processing control unit 46 in step S207 performs a control for discharging the subsequent paper of quality inspection OK to the discharge tray 43.

The image forming control unit 25 pauses the printing processing in step S208.

Figure 8:
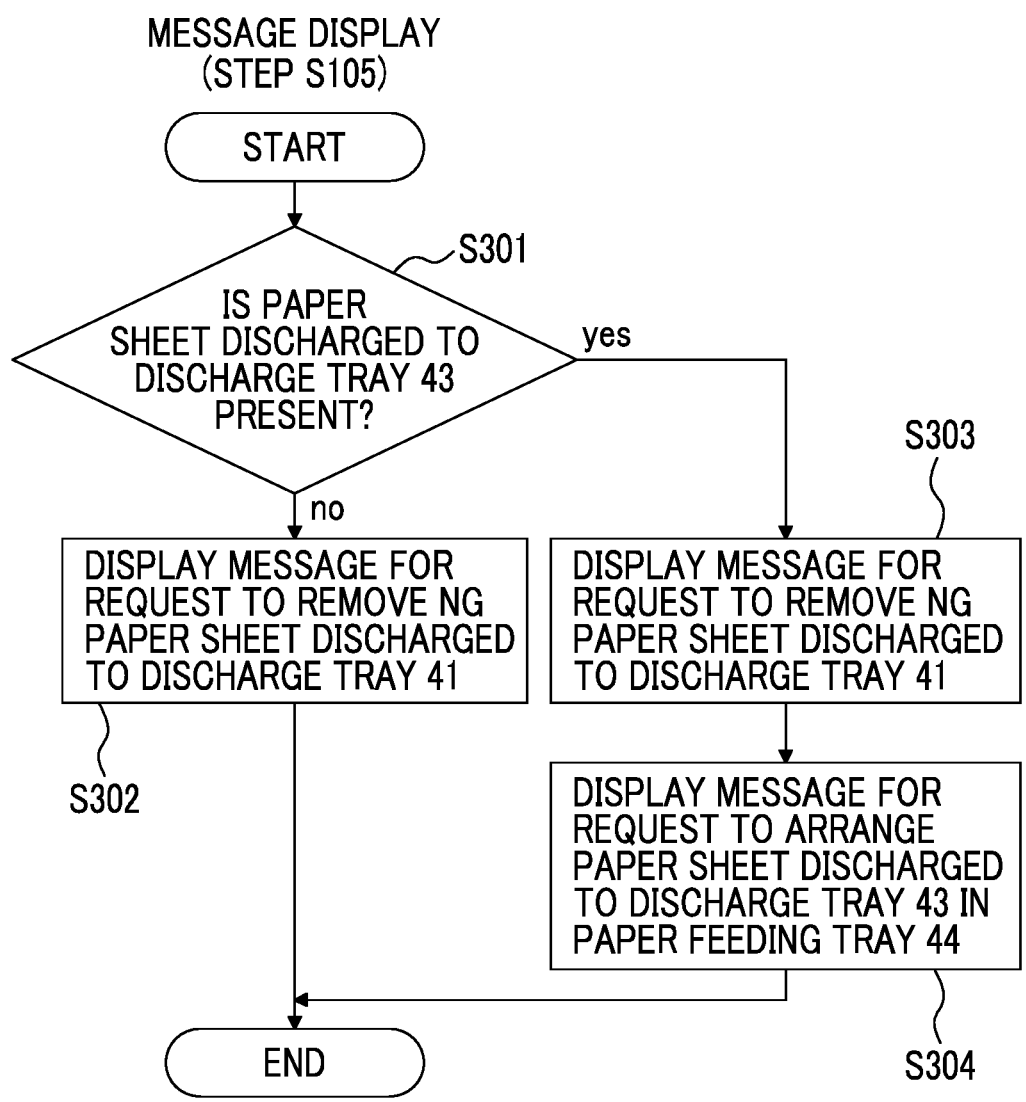
FIG. 8 is a flowchart for describing details of message display processing of step S105 in the flowchart of FIG. 6.

Next, details of message display processing of step S105 described above will be described with reference to the flowchart of FIG. 8.

In step S301, the image forming control unit 25 determines whether or not a paper sheet discharged to the discharge tray 43 is present in the post-processing device 40.

In a case where a determination that the paper sheet discharged to the discharge tray 43 is not present is made, the image forming control unit 25 in step S302 displays a message for requesting the user to remove an NG paper sheet discharged to the discharge tray on the operation panel 23.

Figure 9:
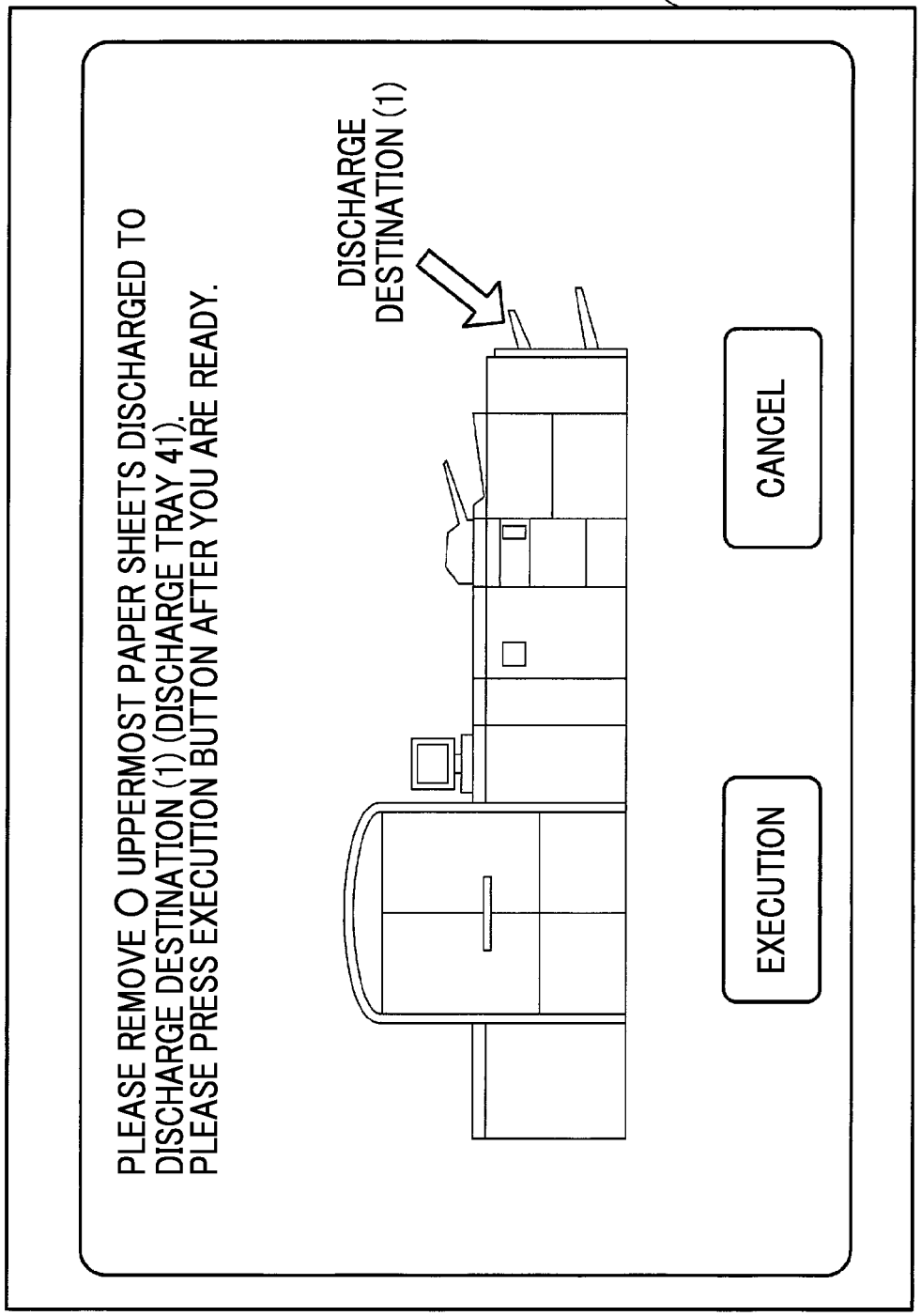
FIG. 9 is a diagram illustrating a message display example displayed in step S302 in FIG. 8.

A message display example displayed on the operation panel 23 in such a manner is illustrated in FIG. 9. With reference to FIG. 9, display of a sentence "Please remove ○ uppermost paper sheets discharged to discharge destination 1 (discharge tray 41). Please press execution button after you are ready." on the operation panel 23 and illustration of a location of discharge destination 1 are perceived.

Here, only a paper sheet of which the quality inspection is OK among the subsequent paper of the paper sheet determined as having the abnormality in the image is discharged to the discharge tray 43. Thus, absence of the paper sheet discharged to the discharge tray 43 means that even in a case where the subsequent paper is present at detection of the abnormality in the image of the certain page, the subsequent paper is discharged to the discharge tray 41 by detecting the abnormality in the image. Thus, in this case, the user is notified of a request to remove the NG paper sheet discharged on the discharge tray 41 that is discharge destination 1.

In a case where a determination that the paper sheet discharged to the discharge tray 43 is present is made, the image forming control unit 25 in steps S303 and S304 displays a message for requesting the user to remove the NG paper sheet discharged to the discharge tray and a message for requesting arrangement of the paper sheet discharged to the discharge tray 43 in the paper feeding tray 44 on the operation panel 23.

Figure 10:
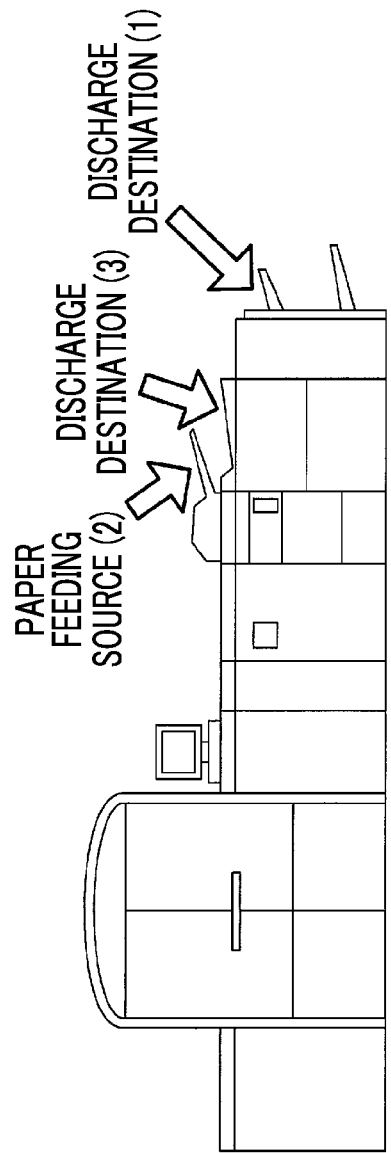
FIG. 10 is a diagram illustrating a message display example displayed in steps S303 and S304 in FIG. 8.

A message display example displayed on the operation panel 23 in such a manner is illustrated in FIG. 10. With reference to FIG. 10, display of a sentence "Please remove ○ uppermost paper sheets discharged to discharge destination 1 (discharge tray 41)." and a sentence "Please move paper sheet discharged to discharge destination 3 (discharge tray 43) to paper feeding source 2." on the operation panel 23 and illustration of locations of discharge destination 1, discharge destination 3, and paper feeding source 2 are perceived.

Figure 11:
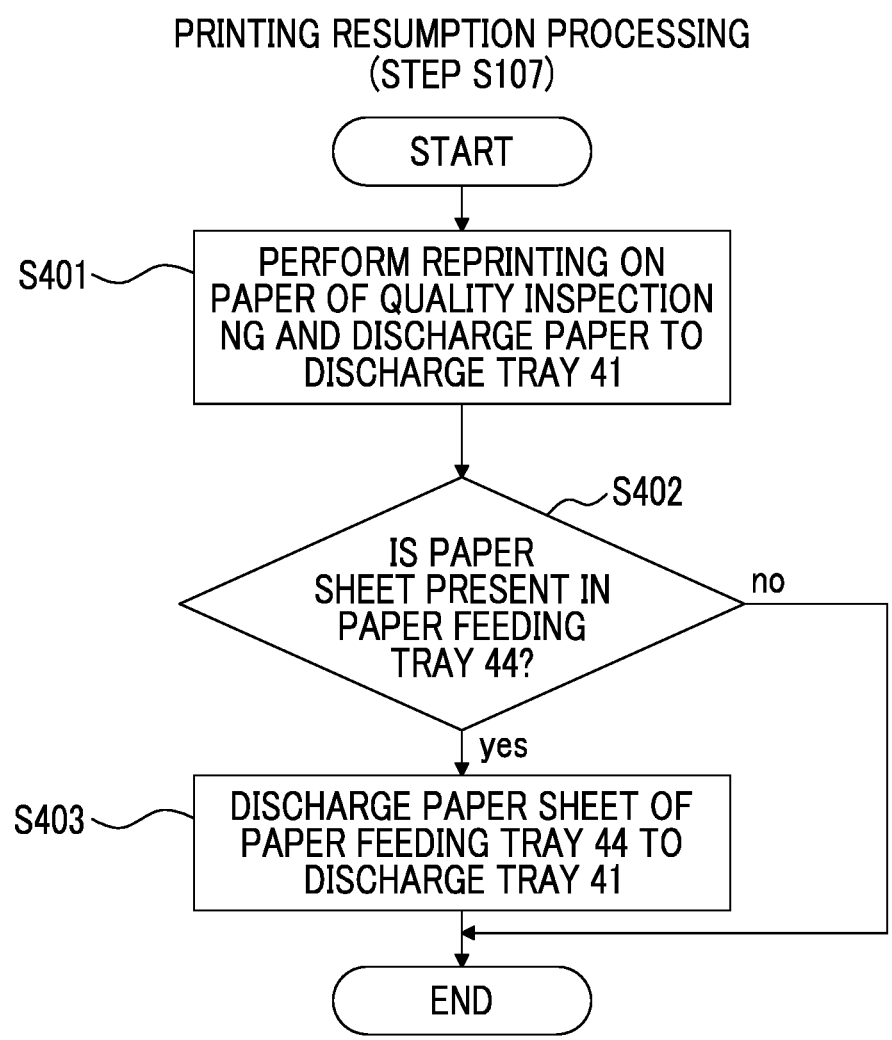
FIG. 11 is a flowchart for describing details of printing resumption processing of step S107 in the flowchart of FIG. 6.

Last, details of the printing resumption processing of step S107 described above will be described with reference to the flowchart of FIG. 11.

In the printing resumption processing, in step S401, the image forming control unit 25 executes the reprinting of the page of the quality inspection NG by controlling the image output unit 24. The paper sheet on which the reprinting is performed is discharged to the discharge tray 41 in the post-processing device 40.

In step S402, in a case where a determination that a paper sheet arranged in the paper feeding tray 44 is present is made, the post-processing control unit 46 in step S403 performs a control for discharging the paper sheet of the paper feeding tray 44 to the discharge tray 41. The subsequent paper of the paper sheet of the quality inspection NG is arranged in the paper feeding tray 44. Thus, by discharging the paper sheet arranged in the paper feeding tray 44 to the discharge tray 41 after the paper sheet on which the page of the quality inspection NG is reprinted is discharged to the discharge tray 41, the paper sheet of each page is discharged on the discharge tray 41 without changing a page order.

Next, the operation of the image forming system 10 of the exemplary embodiment will be described using a specific printing processing example.

In the following description, in the same manner as the printing job example illustrated in FIG. 3, a case where the image is abnormal due to occurrence of the abnormality in the printing processing of the paper sheet of the second page at execution of the printing job of performing the printing processing on the paper sheets of the seven pages and then, performing the stapling processing will be described with reference to FIG. 12. Even in this description, a case of performing processing of discharging the paper sheets to two discharge destinations of the discharge tray 41 and the discharge tray 42 will be described.

Figure 12:
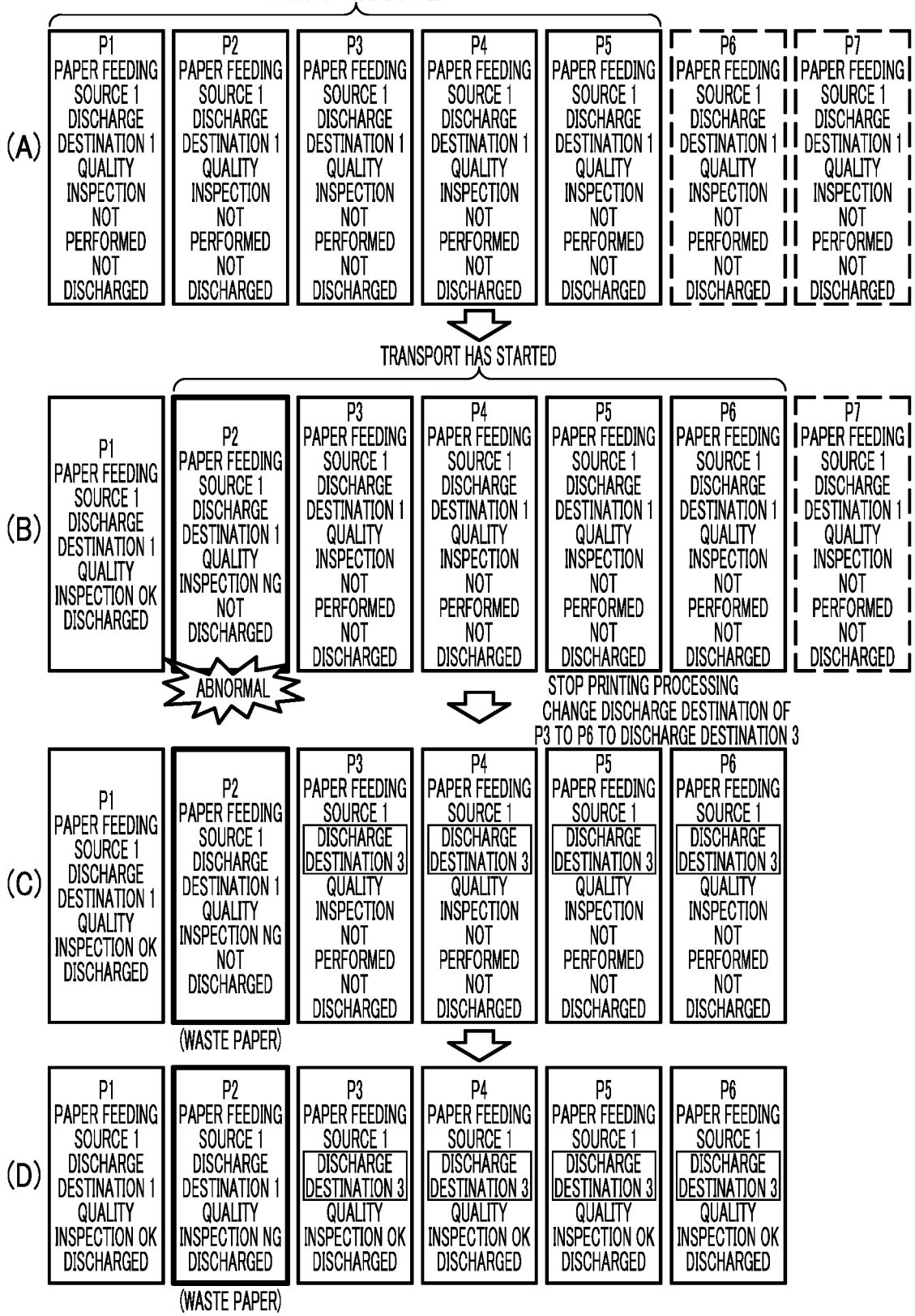
FIG. 12 is a diagram for describing a state where an image is abnormal due to occurrence of an abnormality in the printing processing of the paper sheet of the second page at execution of the printing job of performing the printing processing on the paper sheets of the seven pages and then, performing the stapling processing in the image forming system 10 of the exemplary embodiment of the present invention.

First, as illustrated a part (A) of FIG. 12, an assumption that the printing processing of the paper sheets of the first to fifth pages (P1 to P5) has already started immediately before the quality inspection of the first page is executed is made.

Thus, as illustrated a part (B) of FIG. 12, at a point in time of performing the quality inspection of the second page and determining that the second page is abnormal, the printing processing of the paper sheets of the third to sixth pages (P3 to P6) has already started.

In a case where the printing processing is stopped as illustrated a part (C) of FIG. 12 by determining that the abnormality is present in the image of the paper sheet of the second page as illustrated the part (B) of FIG. 12, the discharge destination of the paper sheets of the third to sixth pages (P3 to P6) is changed to discharge destination 3 (discharge tray 43).

Consequently, the paper sheet of the second page (P2) of the quality inspection NG is discharged to the discharge tray 41, and the paper sheets of the third to sixth pages (P3 to P6) of the subsequent paper are discharged to the discharge tray 43. A state of the post-processing device 40 in such a state is illustrated in FIG. 13.

Figure 13:
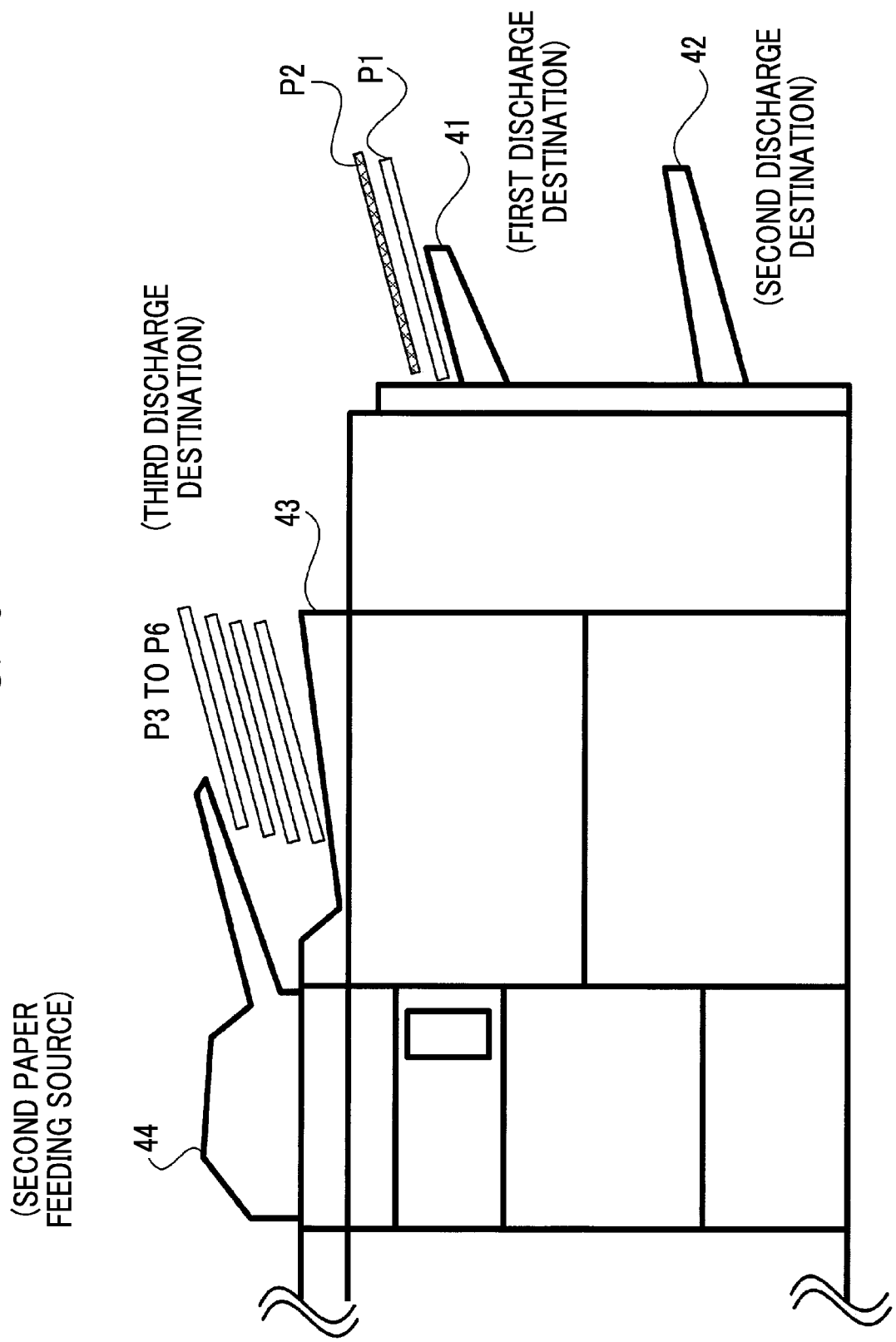
FIG. 13 is a diagram illustrating a state of the post-processing device 40 in a state where the paper sheet of the second page (P2) that results in NG in the quality inspection is discharged to a discharge tray 41, and where the paper sheets of the third to sixth pages (P3 to P6) that are subsequent paper are discharged to a discharge tray 43.

In the post-processing device 40 illustrated in FIG. 13, discharge of the paper sheet of the first page (P1) on which the abnormality is not detected in the image to the discharge tray 41, and discharge of the paper sheet of the second page (P2) on which the abnormality is detected in the image to the discharge tray 41 are perceived. The paper sheets of the third to sixth pages (P3 to P6) that are the subsequent paper of the paper sheet of the second page (P2) on which the abnormality is detected in the image are discharged to the discharge tray 43. By detecting the paper sheet on which the abnormality is present in the image in the quality inspection in the quality inspection device 30, the printing processing is paused in a state illustrated in FIG. 13.

Figure 14:
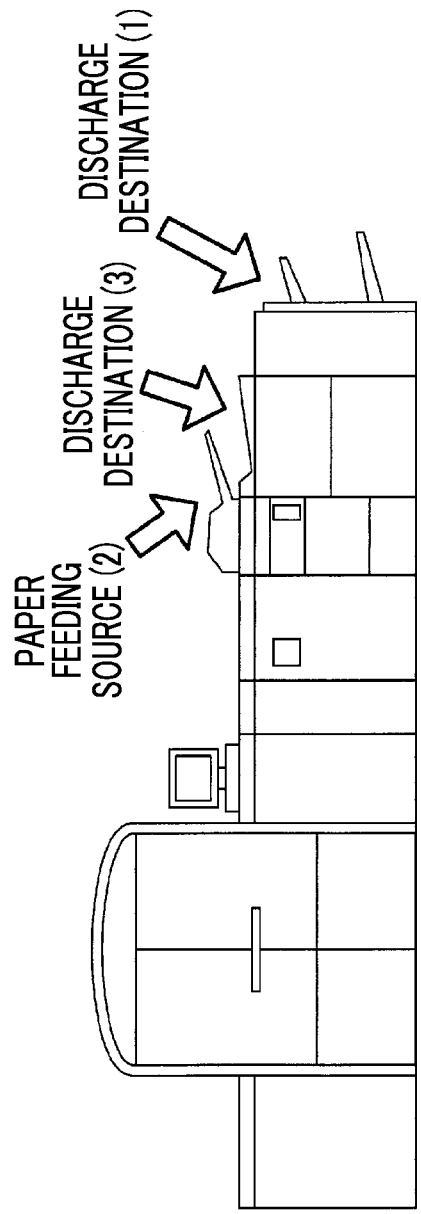
FIG. 14 is a diagram illustrating a message display example displayed on an operation panel 23 of the image forming apparatus 20.

Then, a message illustrated in FIG. 14 is displayed on the operation panel 23 of the image forming apparatus 20. With reference to FIG. 14, illustration of a sentence "Please remove one uppermost paper sheet discharged to discharge destination 1. Please move paper sheet discharged to discharge destination 3 to paper feeding source 2. Please press execution button after you are ready." and the locations of discharge destinations 1 and 3 and paper feeding source 2 on the operation panel 23 are perceived.

Figure 15:
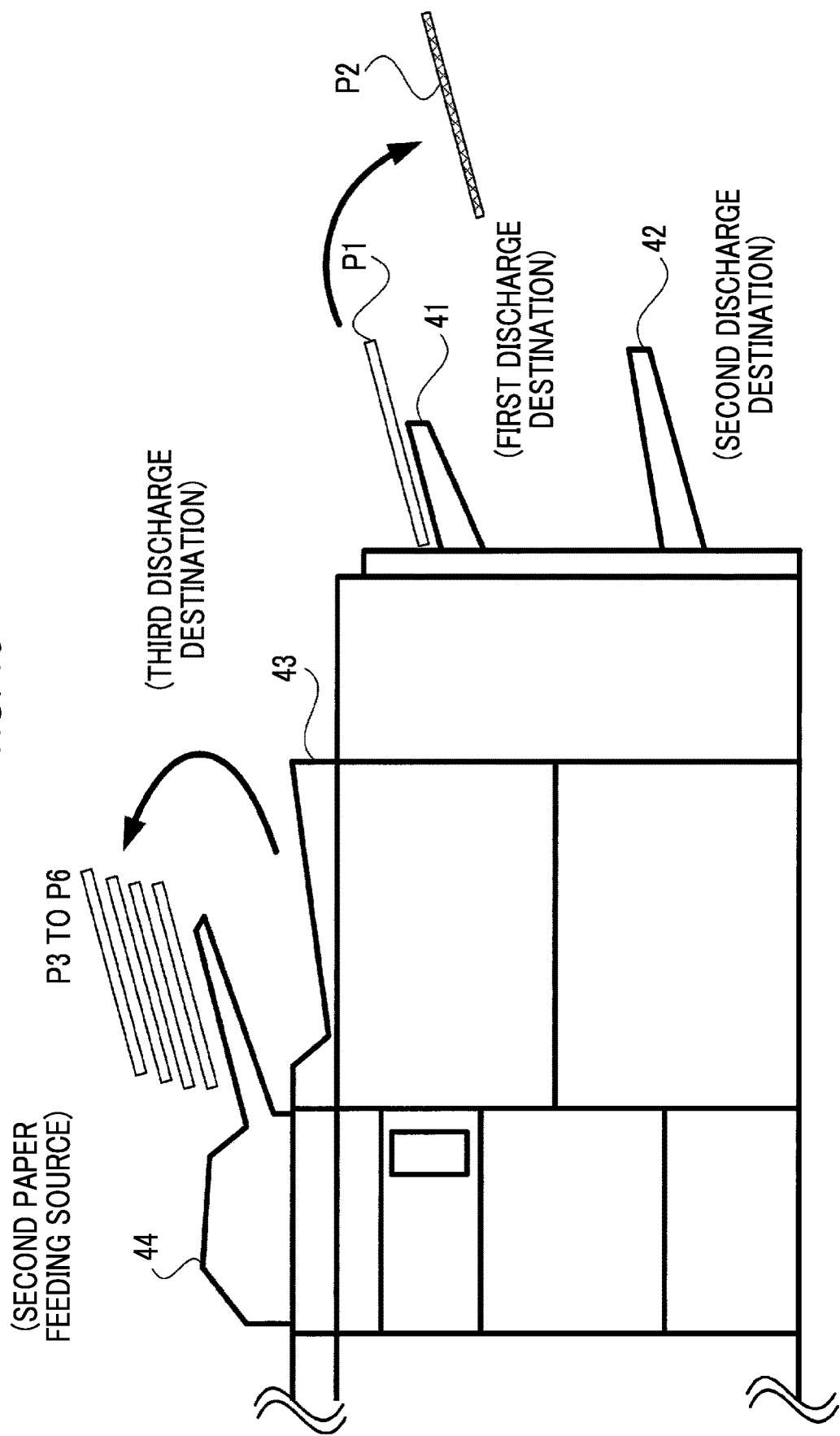
FIG. 15 is a diagram for describing a state where a user who views a message illustrated in FIG. 14 performs a work based on a request of the message.

A state where the user who views such a message performs a work based on a request of the message is illustrated in FIG. 15. With reference to FIG. 15, first, removal and discarding of the paper sheet of the second page (P2) discharged on the top of the paper sheet bundle discharged to discharge destination 1 (discharge tray 41) by the user is perceived. Then, movement of the paper sheets of the third to sixth pages (P3 to P6) discharged to discharge destination 3 (discharge tray 43) to paper feeding source 2 (paper feeding tray 44) by the user is perceived.

After such a work is finished, the printing processing is resumed by pressing an execution button of the operation panel 23 by the user. A state after the printing processing is resumed in such a manner will be described with reference to FIG. 16.

Figure 16:
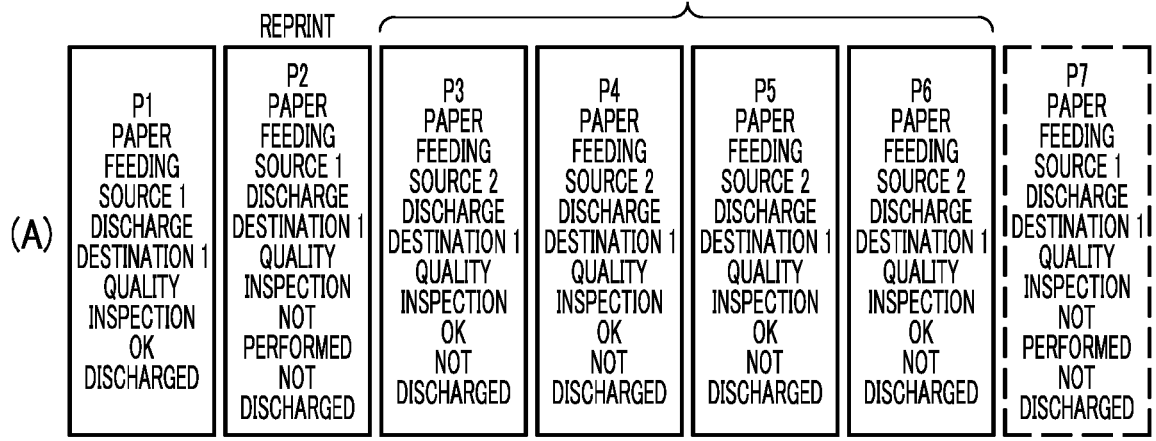
FIG. 16 is a diagram for describing a state after the printing processing is resumed after the user performs the work.

In a case where the printing processing is resumed, the reprinting of the paper sheet of the second page is performed as illustrated a part (A) of FIG. 16. In this state, the paper sheets of the third to sixth pages on which printing has been performed are arranged in the paper feeding tray 44.

In a case where the quality inspection of the paper sheet of the second page on which the reprinting is performed results in OK, and the paper sheet is discharged to the discharge tray 41 as illustrated a part (B) of FIG. 16, feeding of the paper sheets of the third to sixth pages on which printing has been performed and that are arranged in the paper feeding tray 44 is started.

Figure 17:
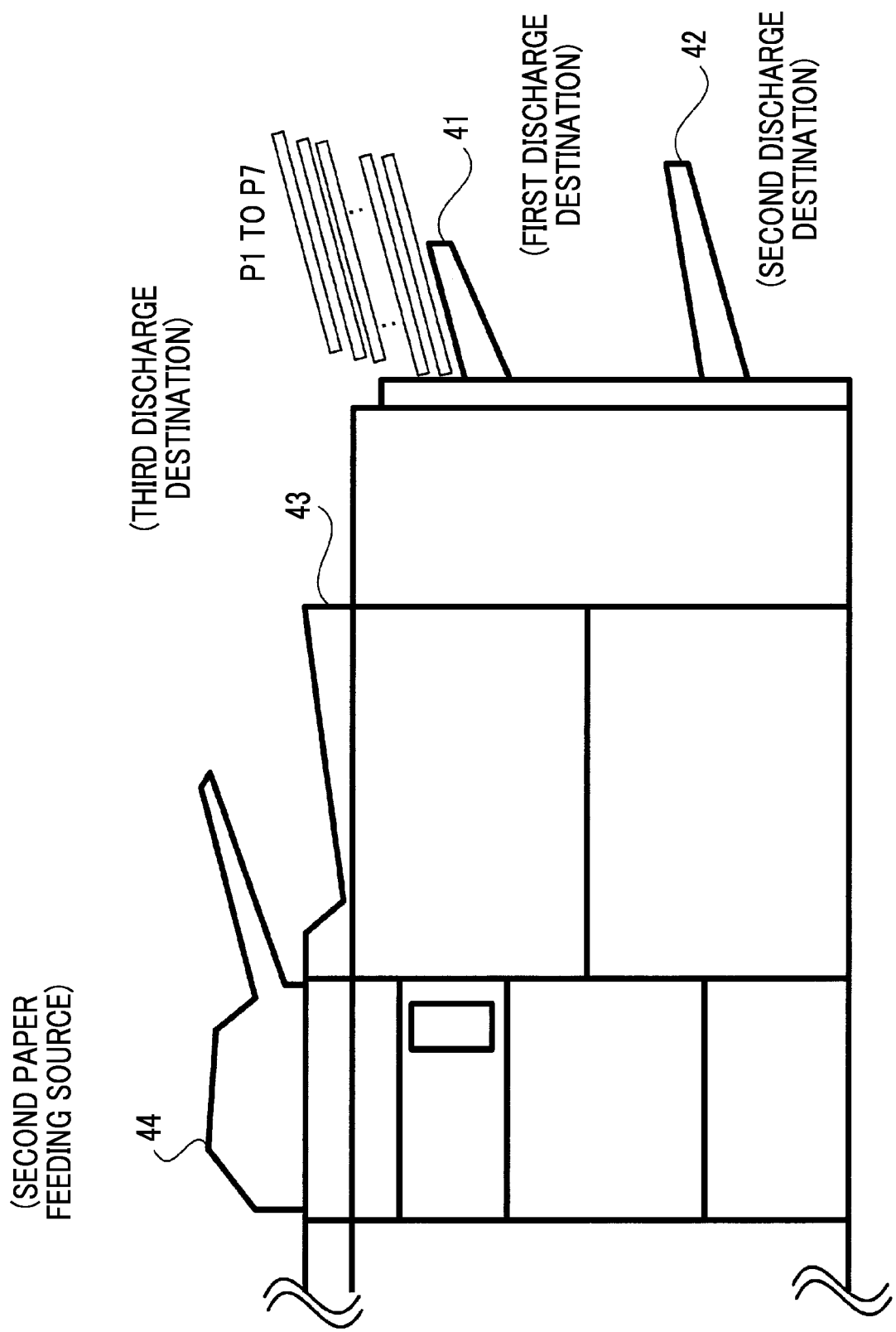
FIG. 17 is a diagram for describing a state after the printing processing of up to the last seventh page is performed after the printing processing is resumed.

Consequently, as illustrated a part (C) of FIG. 16, the paper sheets of the third to sixth pages on which printing has been performed are also discharged to the discharge tray 41 next to the paper sheet of the second page on which the reprinting is performed. Last, in a case where the printing processing is normally performed on the paper sheet of the seventh page, the paper sheet of the seventh page is also discharged to the discharge tray 41. That is, as illustrated in FIG. 17, the paper sheets of all of the first to seventh pages are discharged on the discharge tray 41 in the page order. Thus, the stapling processing is subsequently executed, a printed bundle of the seven pages is generated.

By performing such processing, in the image forming system 10 of the exemplary embodiment, one paper sheet on which the abnormality is detected in the image of the second page is the only discarded paper sheet, and the five paper sheets of the second to sixth pages are not discarded as the waste paper unlike the case illustrated in FIG. 3.

Figure 18:
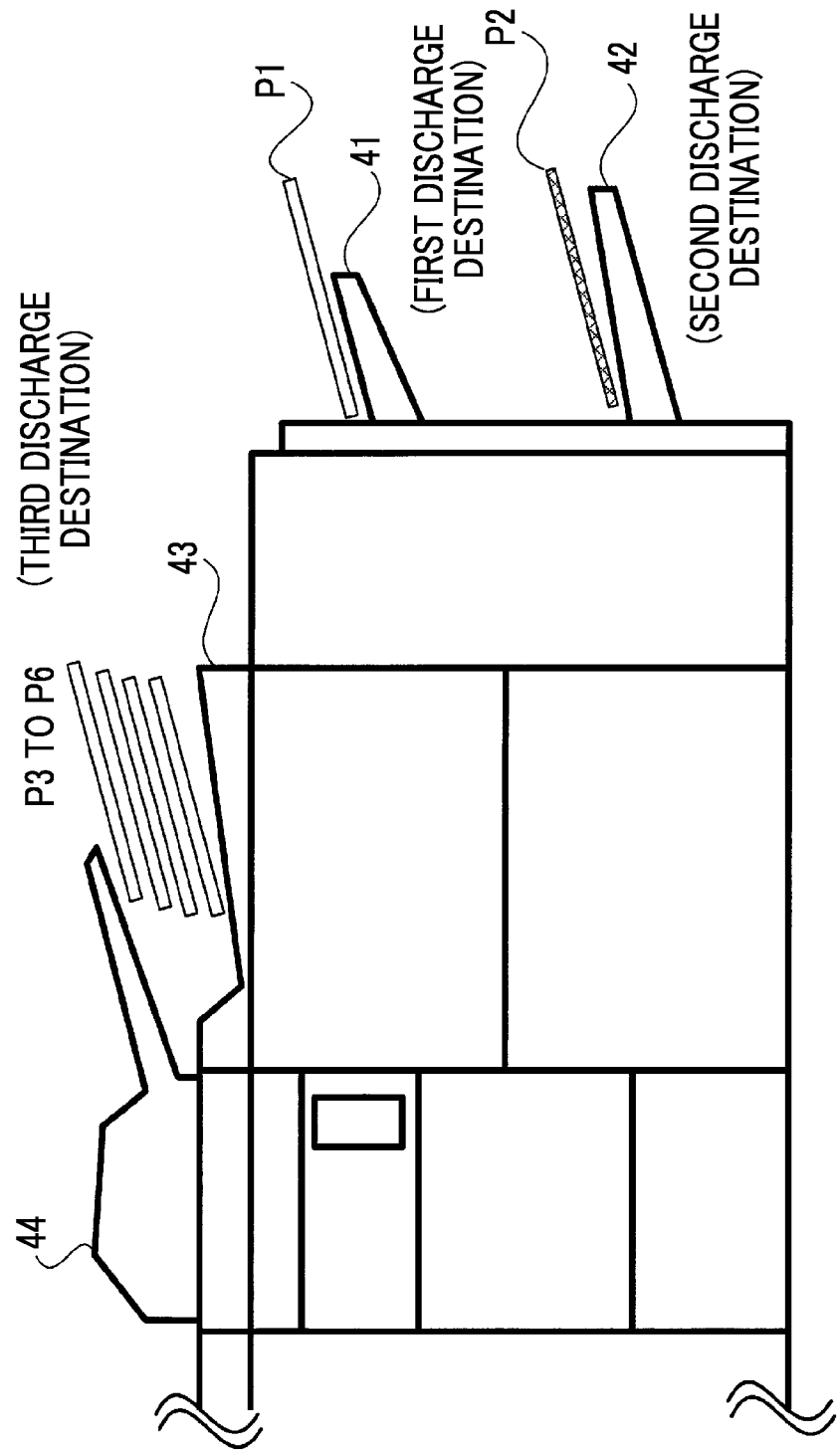
FIG. 18 is a diagram illustrating a discharge state example in a case where the printing processing is executed using three discharge destinations of discharge trays 41 to 43.

While a case of discharging the paper sheets to two discharge destinations of the discharge trays 41 and 43 is used in the above description, a discharge state example in a case of using three discharge destinations is illustrated in FIG. 18.

In FIG. 18, a discharge state in a case where the abnormality is detected in the image of the paper sheet of the second page in the same manner as the specific example described above is illustrated. In this case, discharge of the paper sheet of the second page (P2) on which the abnormality of the image is detected to the discharge tray 42 that is the second discharge destination is perceived. In a case of using three discharge destinations as illustrated in FIG. 18, the user does not need to perform a work of removing the paper sheet of the quality inspection NG from the discharged paper sheet bundle.

Figure 19:
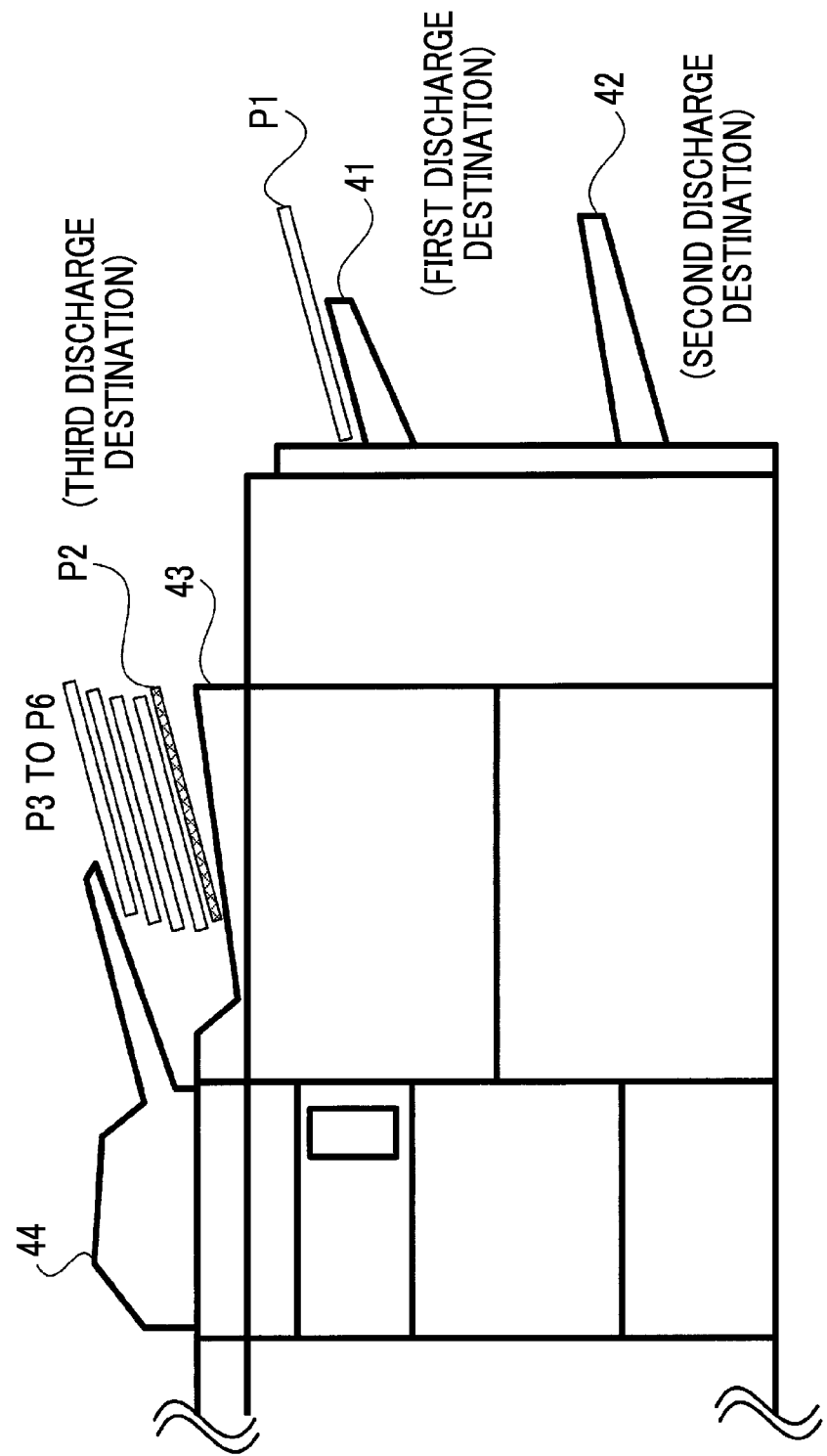
FIG. 19 is a diagram illustrating a discharge state example in which the paper sheet resulting in NG in the quality inspection is discharged to the discharge tray 42 together with the subsequent paper.
Figure 20:
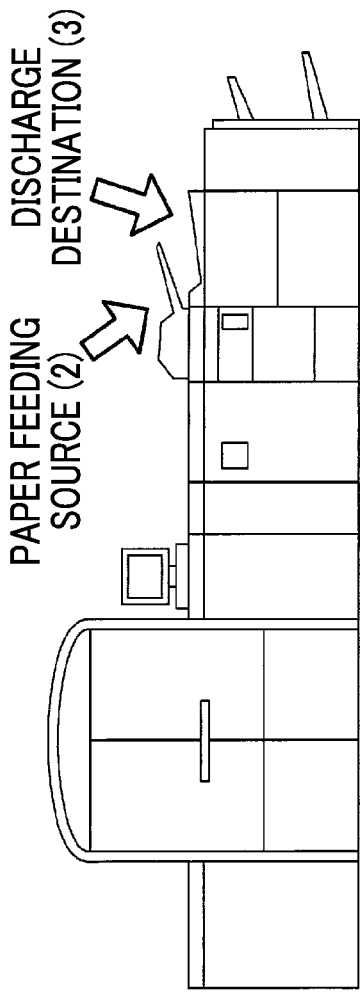
FIG. 20 is a diagram illustrating a message display example that is displayed in a case where the paper sheet resulting in NG in the quality inspection is discharged to the discharge tray 42 together with the subsequent paper.

In addition, a discharge state example in which the paper sheet of the quality inspection NG is discharged to the discharge tray 43 together with the subsequent paper instead of the discharge tray 41 is illustrated in FIG. 19. In addition, a message display example that is displayed in a case where the paper sheet of the quality inspection NG is discharged to the discharge tray 43 as illustrated in FIG. 19 is illustrated in FIG. 20.

In a case where the paper sheet of the quality inspection NG is discharged to the discharge tray 43 together with the subsequent paper, and the user is requested to move the paper sheet of the discharge tray 43 that is the third discharge destination to the paper feeding device 44 that is the second paper feeding source, the user is further requested to remove the paper sheet of the quality inspection NG from the moved paper sheet bundle.

In this case, since the subsequent paper is discharged on the paper sheet of the quality inspection NG, the NG paper needs to be removed from the bottom of the paper sheet bundle.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   a processor configured to:
   in a case where a determination that an abnormality is not present in an image printed on a paper sheet fed from a first paper feeding source is made, discharge a first paper sheet on which the image determined as not having the abnormality is printed to a first discharge destination;
   in a case where a determination that the abnormality is present in the image is made, discharge a second paper sheet on which the image determined as having the abnormality is printed to a second discharge destination;
   discharge a paper sheet of a subsequent page of the second paper sheet, on which printing processing has started, to a third discharge destination for only a third paper sheet of which a quality inspection is OK while an image printed thereon is determined as having no abnormality among the subsequent page of the second paper sheet by comparing an image data of an image printed on the third paper sheet with an image read from the third paper sheet and temporarily stop printing processing;
   notify a user of an instruction to arrange the third paper sheet discharged to the third discharge destination in a second paper feeding source different from the first paper feeding source and different from the third discharge destination; and
   in a case where a notification indicating that the third paper sheet discharged to the third discharge destination is arranged in the second paper feeding source is received from the user, discharge the paper sheet arranged in the second paper feeding source to the first discharge destination by transporting the paper sheet after a paper sheet on which the image of the second paper sheet is reprinted.

2. The image forming system according to claim 1, wherein the first discharge destination and the second discharge destination are an identical discharge device, and
the processor is configured to:
   in a case where the printing processing is temporarily stopped, notify the user of an instruction to remove the paper sheet determined as having the abnormality of the image from a paper sheet bundle discharged on the discharge device.

3. The image forming system according to claim 2, wherein the processor is configured to:
   further notify the user of an instruction for the number of paper sheets to be removed from a top of the paper sheet bundle discharged on the discharge device.

4. The image forming system according to claim 3, wherein the processor is configured to:
   execute post-processing that provides distinction from another paper sheet, on the paper sheet determined as having the abnormality in the printed image.

5. The image forming system according to claim 2, wherein the processor is configured to:
   execute post-processing that provides distinction from another paper sheet, on the paper sheet determined as having the abnormality in the printed image.

6. The image forming system according to claim 1, wherein the processor is configured to:
   execute post-processing that provides distinction from another paper sheet, on the paper sheet determined as having the abnormality in the printed image.

7. The image forming system according to claim 1, wherein the third discharge destination is directly disposed under the second paper feeding source.

8. The image forming system according to claim 1, wherein the second discharge destination is disposed at a lateral side of the image forming system, and the third discharge destination is disposed at an upper side of the image forming system.

9. A non-transitory computer readable medium storing a program causing a computer to execute a process comprising:
   discharging, in a case where a determination that an abnormality is not present in an image printed on a paper sheet fed from a first paper feeding source is made, a first paper sheet on which the image determined as not having the abnormality is printed to a first discharge destination;
   discharging, in a case where a determination that the abnormality is present in the image is made, a second paper sheet on which the image determined as having the abnormality is printed to a second discharge destination;
   discharging a paper sheet of a subsequent page of the second paper sheet, on which printing processing has started, to a third discharge destination for only a third paper sheet of which a quality inspection is OK while an image printed thereon is determined as having no abnormality among the subsequent page of the second paper sheet by comparing an image data of an image printed on the third paper sheet with an image read from the third paper sheet and temporarily stopping printing processing;
   notifying a user of an instruction to arrange the third paper sheet discharged to the third discharge destination in a second paper feeding source different from the first paper feeding source and different from the third discharge destination; and discharging, in a case where a notification indicating that the third paper sheet discharged to the third discharge destination is arranged in the second paper feeding source is received from the user, the paper sheet arranged in the second paper feeding source to the first discharge destination by transporting the paper sheet after a paper sheet on which the image of the second paper sheet is reprinted.

10. An image forming method comprising:

discharging, in a case where a determination that an abnormality is not present in an image printed on a paper sheet fed from a first paper feeding source is made, a first paper sheet on which the image determined as not having the abnormality is printed to a first discharge destination;

discharging, in a case where a determination that the abnormality is present in the image is made, a second paper sheet on which the image determined as having the abnormality is printed to a second discharge destination;

discharging a paper sheet of a subsequent page of the second paper sheet, on which printing processing has started, to a third discharge destination for only a third paper sheet of which a quality inspection is OK while an image printed thereon is determined as having no abnormality among the subsequent page of the second paper sheet by comparing an image data of an image printed on the third paper sheet with an image read from the third paper sheet and temporarily stopping printing processing;

notifying a user of an instruction to arrange the third paper sheet discharged to the third discharge destination in a second paper feeding source different from the first paper feeding source and different from the third discharge destination; and discharging, in a case where a notification indicating that the third paper sheet discharged to the third discharge destination is arranged in the second paper feeding source is received from the user, the paper sheet arranged in the second paper feeding source to the first discharge destination by transporting the paper sheet after a paper sheet on which the image of the second paper sheet is reprinted.

* * * * *